(12) United States Patent
Abelovski

(10) Patent No.: US 8,808,441 B2
(45) Date of Patent: Aug. 19, 2014

(54) INKJET INKS

(71) Applicant: Hewlett-Packard Development Company, L.P., Houston, TX (US)

(72) Inventor: Benjamin Abelovski, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/720,114

(22) Filed: Dec. 19, 2012

(65) Prior Publication Data

US 2014/0168331 A1    Jun. 19, 2014

(51) Int. Cl.
*C09D 11/02*    (2014.01)

(52) U.S. Cl.
USPC .................. 106/31.68; 106/31.36; 106/31.27; 106/31.6

(58) Field of Classification Search
USPC .................. 106/31.68, 31.36, 31.27, 31.6
See application file for complete search history.

(56) References Cited

U.S. PATENT DOCUMENTS

| | | | |
|---|---|---|---|
| 5,108,501 A | | 4/1992 | Moffatt |
| 5,133,803 A | * | 7/1992 | Moffatt ...................... 106/31.37 |
| 5,749,952 A | * | 5/1998 | Tsang et al. ............... 106/31.64 |
| 6,394,594 B1 | | 5/2002 | Katsuragi et al. |
| 6,616,741 B1 | * | 9/2003 | Sawa et al. ................. 106/31.68 |
| 6,796,650 B2 | | 9/2004 | Brignone et al. |
| 7,388,040 B2 | | 6/2008 | Sader et al. |
| 8,029,611 B2 | | 10/2011 | Vonwiller et al. |
| 2008/0092773 A1 | | 4/2008 | Matsuyama |
| 2010/0285287 A1 | | 11/2010 | Matsuyama et al. |
| 2012/0249623 A1 | | 10/2012 | Vasudevan et al. |

FOREIGN PATENT DOCUMENTS

| | | |
|---|---|---|
| EP | 2386612 | 11/2011 |
| KR | 100488188 | 9/2005 |
| WO | 2006063096 | 6/2006 |
| WO | 2012039721 | 3/2012 |

OTHER PUBLICATIONS

Search Report and Written Opinion dated Mar. 26, 2014 for PCT/US2013/074393, Applicant Hewlett-Packard Development Company, L.P.

* cited by examiner

*Primary Examiner* — Veronica F Faison

(57) ABSTRACT

The present disclosure provides inkjet inks and associated methods and systems. In one example, an inkjet ink can comprise an ink vehicle and a colorant, wherein the ink vehicle includes an organic co-solvent, water, and from 0.0001 wt % to 0.1 wt % dextran based on the inkjet ink as a whole.

15 Claims, No Drawings

INKJET INKS

BACKGROUND

There are several reasons that inkjet printing has become a popular way of recording images on various media surfaces, particularly paper and photo media substrates. Some of these reasons include low printer noise, capability of high-speed recording, and capability of multicolor recording. Additionally, these advantages can be obtained at a relatively low price to consumers. With respect to inkjet ink chemistry, the majority of commercial inkjet inks are water-based. Thus, their constituents are generally water-soluble, as is the case with many dyes, or water dispersible, as is the case with pigments. Furthermore, inkjet inks have low viscosity to accommodate high frequency jetting and firing chamber refill processes can be typical in inkjet architecture. Furthermore, sometimes inks having positive printing characteristics with respect to certain inkjet architectures may have less than ideal performance on the printed page, and vice versa. Thus, finding specific formulations that perform well in a printer device as well as on print media can be a challenge.

DETAILED DESCRIPTION

It has been recognized that inkjet inks can incorporate water soluble dextrans to provide excellent ink-jetting properties and provide for more environmentally friendly inks. In accordance with this, inkjet ink compositions and associated methods described herein are directed to the incorporation and use of water soluble dextrans as an additive in inkjet inks. It is noted that when discussing the present inks, methods, and systems, each of these discussions can be considered applicable to each of these examples, whether or not they are explicitly discussed in the context of that example. Thus, for example, in discussing a dextran in an inkjet ink, such a dextran can also be used in a method of using a dextran as an anti-kogation additive in an inkjet ink, and vice versa.

Generally, inkjet inks use polymeric binders, fixing compounds, polyurethanes (PU), etc., to achieve desirable ink reliability including kogation performance. However, it has been recognized that inkjet inks can be modified with a non-functionalized dextran to provide improved kogation performance. In one example, the use of the non-functionalized dextran can further eliminate the need for other traditional additives such as polymeric binders, fixing compounds, PUs, etc. To this end, it has been recognized that a very small amount, e.g., 0.0001 wt % to 0.1 wt %, of a non-functionalized dextran can be used in inkjet inks to provide excellent kogation without the need of traditional additives such as polymeric binders, fixing compounds, PUs, etc. Notably, dextran, a non-functionalized polysaccharide, is on the FDA generally recognized as safe (GRAS) list for indirect food applications and is much more environmentally friendly than many traditional anti-kogation compounds. As such, the present inkjet inks can have excellent ink reliability with improved environmental impact.

With the above in mind, an inkjet ink can comprise an ink vehicle and a colorant, where the ink vehicle comprises an organic co-solvent, water, and from 0.0001 wt % to 0.1 wt % dextran based on the inkjet ink as a whole. In one specific example, the inkjet ink can be devoid of polymeric binder, fixing compound, and polyurethane.

As discussed herein, the present inkjet inks can have excellent kogation by incorporation of a small amount of a dextran. As used herein, "dextran" refers to a complex, branched glucan having $\alpha$-1,6 glycosidic linkages between glucose molecules, while branches begin from $\alpha$-1,3 linkages. In one example, the dextran can be water soluble, e.g., water solubility of at least 100 g/L. In one specific aspect, the dextran can have a water solubility of at least 500 g/L.

In additional detail, the dextran can have a weight average molecular weight (Mw) of at least 70,000 Mw, at least 100,000 Mw, or at least 150,000 Mw. In yet another aspect, the dextran can range from 70,000 Mw to 500,000 Mw, or can alternatively be at least 500,000 Mw. As mentioned, the dextran can be added in very small amounts as discussed herein. In one example, as mentioned, the dextran can be present in the inkjet ink in an amount ranging from 0.001 wt % to 0.1 wt %. In another aspect, the dextran can be present in the inkjet ink in an amount ranging from about 0.01 wt % to about 0.05 wt %.

Generally, any colorant can be used in the present inkjet inks. In one example, the colorant can be a pigment. In one aspect, the pigment can impart color to the ink. Generally, as used herein, a colorant can include a dye and/or pigment. As used herein, "dye" refers to compounds or molecules that impart color to an ink vehicle. As such, dye includes molecules and compounds that absorb electromagnetic radiation or certain wavelengths thereof. For Example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics, metallic particulates, or other opaque particles. As discussed above, the pigment may or may not impart color. However, in one specific example, the colorant can be a cyan pigment, which can benefit particularly from the formulations set forth herein.

Regarding kogation performance, kogation of the inkjet ink can be measured through a variety of printing characteristics, such as drop weight, drop velocity, and decap. In one example, after 1 billion drops per nozzle (BDPN), the present inkjet inks can maintain a drop weight within 20 wt % of the initial drop per nozzle. In one aspect, the present inkjet inks can maintain a drop weight within 15% of the initial drop per nozzle, and in one specific aspect, within 10% of the initial drop per nozzle. Additionally, after 1 BDPN, the present inkjet inks can maintain a drop velocity within 20 wt % of the initial drop per nozzle. In another aspect, the present inkjet inks can maintain a drop velocity within 15% of the initial drop per nozzle, within 10% of the initial drop per nozzle, or in one specific aspect, within 5% of the initial drop per nozzle. Further, the present inkjet inks can have a 7 second decap of 2 or less, and in one aspect, a 7 second decap of 1 or less.

Additionally, the present inkjet inks containing a dextran can have superior drop velocity and drop weight compared to comparable inkjet inks when fired from the same printer at the same printing settings. Drop velocity and drop weight improvements, for example, can be measured by comparing the present inkjet inks to a comparable inkjet ink that does not have a dextran, but that is otherwise identical (water used to replace the missing small concentration of the dextran). In one example, the present inkjet inks can have at least a 10 wt % increased drop weight. In one aspect, the present inkjet inks can have at least a 20 wt % increased drop weight, and in specific aspect, at least a 30 wt % increased drop weight. In one example, the present inkjet inks can have at least a 10% increased drop velocity. In some aspects, the present inkjet inks can have at least a 20% increased drop velocity, at least a 30% increased drop velocity, and in specific aspect, at least a 40% increased drop velocity. Similar improvement can likewise been seen when compared against many other similarly prepared inks that affirmatively include more traditional anti-kogation agents instead of the dextrans of the present disclosure.

Generally, the present inkjet inks contain a colorant and an ink vehicle. As used herein, "liquid vehicle" or "ink vehicle" refers to the liquid fluid in which a colorant is placed to form an ink. In one example, the liquid vehicle can also include a colorant. Ink vehicles are well known in the art, and a wide variety of ink vehicles may be used with the systems and methods of the present invention. Such ink vehicles may include a mixture of a variety of different agents, including, surfactants, solvents, co-solvents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc. Additionally, the term "aqueous liquid vehicle" or "aqueous vehicle" refers to a liquid vehicle including water as a solvent. In one aspect, water can comprise a majority of the liquid vehicle.

As discussed herein, while the present inkjet inks can contain traditional additives, in one example, the inkjet inks can exclude anti-kogation additives including without limitation polymeric binders, fixing compounds, PUs, and mixtures thereof. In fact, in one example, all of these types of anti-kogation additives can be left out of the inkjet ink formulation. That being stated, in some examples, these types of anti-kogation additives can be present in the inkjet inks in low amounts, including less than 0.5 wt %, less than 0.1 wt %, or even less than 0.05 wt %.

The inkjet ink compositions of the present disclosure can also be suitable for use on many types of substrates of recording media, including but not limited, plain paper, gloss media, porous media, non-porous media, etc.

Typical ink vehicle formulations described herein can include water, and can further include co-solvents present in total at from 0.1 wt % to 30 wt %, depending on the jetting architecture, though amounts outside of this range can also be used. Further, non-ionic, cationic, and/or anionic surfactants can be present, ranging from 0.01 wt % to 10 wt %. In addition to the colorant, the balance of the formulation can be purified water, or other vehicle components known in the art, such as biocides, viscosity modifiers, materials for pH adjustment, sequestering agents, preservatives, and the like. In one Example, the ink vehicle can be predominantly water and can be referred to as an aqueous liquid vehicle.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for Example, can be used. Viscosity modifiers and buffers may also be present, as well as other additives known to those skilled in the art to modify properties of the ink as desired. Such additives can be present at from 0 wt % to 20 wt %.

In addition to the inkjet inks described herein, the present disclosure provides for methods relating thereto. Generally, a method of using a dextran as an anti-kogation additive in an inkjet ink can comprise combining the dextran with an ink vehicle of the inkjet ink, the inkjet ink comprising a colorant and the ink vehicle comprising an organic co-solvent, water, and from 0.0001 wt % to 0.1 wt % of the dextran based on the inkjet ink as a whole. In one example, the method can further comprise adding a second organic co-solvent to the ink vehicle. In another example, a surfactant can be added to the ink vehicle.

Regarding the present method steps, such steps can be performed in a number of sequences and are not intended to be limited to the order written. For example, the second organic co-solvent can be added to the inkjet ink before the dextran, and vice versa. Additionally, it is noted that any and all combinations of such steps or individual step may be performed sequentially or simultaneously. For Example, adding the second organic co-solvent and adding the surfactant may be performed sequentially or may be performed simultaneously. Furthermore, the colorant can be added at any point in time, such as with the ink vehicle, or after the ink vehicle is prepared.

Further, a system for inkjet printing can comprise an inkjet ink that includes a colorant and an ink vehicle, and an inkjet printer adapted to print the inkjet ink. The ink vehicle can comprise an organic co-solvent, water, and from 0.0001 wt % to 0.1 wt % of a dextran based on the inkjet ink as a whole. The inkjet printer can be adapted to print the inkjet ink, wherein after printing 1 billion drops per nozzle, the inkjet ink maintains a drop weight within 20 wt % of an initial drop per nozzle, and wherein inkjet ink maintains a drop velocity within 20% of the initial drop per nozzle.

It is to be understood that this disclosure is not limited to the particular process steps and materials disclosed herein because such process steps and materials may vary somewhat. It is also to be understood that the terminology used herein is used for the purpose of describing particular Examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following Examples illustrate some examples of the present inkjet inks, methods and systems that are presently known. However, it is to be understood that the following are only exemplary or illustrative of the application of the principles of the present compositions, methods, and systems. Numerous modifications and alternative compositions, methods, and systems may be devised by those skilled in the art without departing from the spirit and scope of the present compositions, methods, and systems. The appended claims are intended to cover such modifications and arrangements. Thus, while the present inkjet inks, methods, and systems have been described above with particularity, the following examples provide further detail in connection with what are presently deemed to be acceptable examples.

Example 1

Cyan Inkjet Inks

Two Cyan inkjet inks were prepared by admixing the Compositional Components at the concentrations listed in Table 1.

TABLE 1

| Compositional Components | Cyan 1 (wt %) | Cyan 2 (wt %) |
|---|---|---|
| 1st Cyclic amide co-solvent | 8.91 | — |
| 2nd Cyclic amide co-solvent | — | 5.88 |
| Nonionic surfactant | 0.35 | 0.35 |
| Proxel ® GXL (microbicide) | 0.10 | 0.10 |
| Kordek ™ MLX (microbicide) | 0.14 | 0.14 |
| Pigment | 1.75 | 2.50 |
| Dextran 500,000 Mw | 0.01 | 0.01 |
| Water | Balance | Balance |

Example 2

Comparative Cyan Inkjet Inks

Two Comparative Cyan inkjet inks were prepared by admixing the Compositional Components at the concentrations listed in Table 2.

TABLE 2

| Compositional Elements | Comparative Cyan 1 (wt %) | Comparative Cyan 2 (wt %) |
|---|---|---|
| 1st Cyclic amide co-solvent | 8.91 | — |
| 2nd Cyclic amide co-solvent | — | 5.88 |
| Crodafos ™ N3 Acid | 0.50 | 0.50 |
| Nonionic surfactant | 0.30 | — |
| Nonionic surfactant (acetylenic diol-based) | — | 0.70 |
| Proxel ® GXL (microbicide) | 0.10 | 0.10 |
| Kordek ™ MLX (microbicide) | 0.14 | 0.14 |
| Pigment | 1.75 | 2.50 |
| Water | Balance | Balance |

Example 3

Drop Weight and Drop Velocity Data

The Cyan inkjet inks of Example 1 and the Comparative Cyan inkjet inks of Example 2 were tested for drop weight and drop velocity under the same printing conditions at various intervals as listed in Table 3 and Table 4.

TABLE 3

| | Drop Weight (ng) Inkjet Inks | | Drop Weight (ng) Comparative Inks | |
|---|---|---|---|---|
| MDPN | Cyan 1 | Cyan 2 | Cyan 1 | Cyan 2 |
| 0 | 5.70 | 5.18 | 4.45 | 4.32 |
| 1 | 5.62 | 5.21 | 4.38 | 4.24 |
| 50 | 5.70 | 5.39 | 4.18 | 4.39 |
| 350 | 5.73 | 4.49 | 3.41 | 3.22 |
| 700 | 5.24 | 4.57 | 3.05 | 3.07 |
| 1000 | 5.12 | 4.50 | 3.10 | 3.08 |
| % diff | −10 | −13 | −30 | −29 |

% diff is between initial (0) and 1000 MDPN; MDPN is million drops per nozzle (1000 MDPN is equivalent to 1 BDPN)

TABLE 4

| | Drop Velocity (m/s) | | Drop Velocity (m/s) Comparative Inks | |
|---|---|---|---|---|
| | Inkjet Inks | | Comparative | Comparative |
| MDPN | Cyan 1 | Cyan 2 | Cyan 1 | Cyan 2 |
| 0 | 10.12 | 10.00 | 6.18 | 6.16 |
| 1 | 9.71 | 10.11 | 6.12 | 5.97 |
| 50 | 10.01 | 10.59 | 5.84 | 6.33 |
| 350 | 10.50 | 5.82 | 3.89 | 3.28 |
| 700 | 8.90 | 6.46 | 3.23 | 3.04 |
| 1000 | 9.62 | 7.21 | 3.88 | 3.17 |
| % diff | −5 | −28 | −37 | −49 |

% diff is between initial (0) and 1000 MDPN; MDPN is million drops per nozzle (1000 MDPN is equivalent to 1 BDPN)

Example 4

Cyan Inkjet Inks with Dextran at Various Molecular Weights

Various dextran containing inkjet inks were prepared according to the concentrations and Compositional Components listed in Table 5. Note that Cyan Ink 7 is the same as Cyan Ink 1 from Example 1.

TABLE 5

| Compositional Components | Cyan Ink 3 (wt %) | Cyan Ink 4 (wt %) | Cyan Ink 5 (wt %) | Cyan Ink 6 (wt %) | Cyan Ink 7 (wt %) |
|---|---|---|---|---|---|
| 1$^{st}$ Cyclic amide co-solvent | 8.91 | 8.91 | 8.91 | 8.91 | 8.91 |
| Nonionic surfactant | 0.30 | 0.30 | 0.30 | 0.30 | 0.30 |
| Proxel ® GXL (microbicide) | 0.10 | 0.10 | 0.10 | 0.10 | 0.10 |
| Kordek ™ MLX (microbicide) | 0.14 | 0.14 | 0.14 | 0.14 | 0.14 |
| Cyan Pigment | 1.75 | 1.75 | 1.75 | 1.75 | 1.75 |
| Dextran 70,000 Mw | 0.01 | — | — | — | — |
| Dextran 100,000 Mw | — | 0.01 | — | — | — |
| Dextran 150,000 Mw | — | — | 0.01 | — | — |
| Dextran 200,000 Mw | — | — | — | 0.01 | — |
| Dextran 500,000 Mw | — | — | — | — | 0.01 |
| Water | Balance | Balance | Balance | Balance | Balance |

Example 5

Drop Weight and Drop Velocity Data

The Cyan inkjet inks (Cyan Inks 3-7) from Example 4 and Comparative Cyan Ink 1 from Example 2 were tested for drop weight and drop velocity under the same printing conditions at various intervals as listed in Table 6 and Table 7.

TABLE 6

Drop Weight (ng)

| MDPN | Cyan Ink 3 | Cyan Ink 4 | Cyan Ink 5 | Cyan Ink 6 | Cyan Ink 7 | Comparative Cyan Ink 1 |
|---|---|---|---|---|---|---|
| 0 | 6.02 | 5.67 | 5.69 | 5.83 | 5.70 | 4.45 |
| 1 | 5.78 | 5.55 | 5.48 | 5.68 | 5.62 | 4.38 |
| 50 | 5.84 | 5.63 | 5.44 | 5.81 | 5.70 | 4.18 |
| 350 | 5.08 | 4.92 | 5.10 | 5.15 | 5.73 | 3.41 |
| 700 | 4.86 | 4.74 | 4.98 | 5.00 | 5.24 | 3.05 |
| 1000 | 4.70 | 4.59 | 4.84 | 4.91 | 5.12 | 3.10 |
| % diff | −22 | −19 | −15 | −16 | −10 | −30 |

% diff is between initial (0) and 1000 MDPN;
MDPN is million drops per nozzle (1000 MDPN is equivalent to 1 BDPN)

TABLE 7

Drop Velocity (m/s)

| MDPN | Cyan Ink 3 | Cyan Ink 4 | Cyan Ink 5 | Cyan Ink 6 | Cyan Ink 7 | Comparative Cyan Ink 1 |
|---|---|---|---|---|---|---|
| 0 | 10.06 | 10.24 | 9.86 | 10.38 | 10.12 | 6.18 |
| 1 | 9.20 | 9.88 | 9.23 | 9.72 | 9.71 | 6.12 |
| 50 | 9.38 | 9.85 | 9.32 | 10.17 | 10.01 | 5.84 |
| 350 | 7.22 | 7.70 | 8.10 | 8.09 | 10.50 | 3.89 |
| 700 | 6.74 | 7.29 | 7.74 | 7.82 | 8.90 | 3.23 |
| 1000 | 8.04 | 8.14 | 8.79 | 9.05 | 9.62 | 3.88 |
| % diff | −20 | −21 | −11 | −13 | −5 | −37 |

% diff is between initial (0) and 1000 MDPN;
MDPN is million drops per nozzle (1000 MDPN is equivalent to 1 BDPN)

Example 6

Dextran Ink-Jet Inks with Varying Amounts of Dextran

Various Cyan inkjet inks were prepared according to the concentrations and Compositional Components listed in Table 8. Cyan Ink 8 is the same as Cyan Ink 2 from Example 1.

TABLE 8

| Compositional Components | Cyan Ink 8 (wt %) | Cyan Ink 9 (wt %) | Cyan Ink 10 (wt %) | Cyan Ink 11 (wt %) | Cyan Ink 12 (wt %) |
|---|---|---|---|---|---|
| 2$^{nd}$ Cyclic amide co-solvent | 6.00 | 6.00 | 6.00 | 6.00 | 6.00 |
| Nonionic surfactant | 0.30 | 0.30 | 0.30 | 0.30 | 0.30 |
| Proxel ® GXL (microbicide) | 0.10 | 0.10 | 0.10 | 0.10 | 0.10 |
| Kordek ™ MLX (microbicide) | 0.14 | 0.14 | 0.14 | 0.14 | 0.14 |
| CyanPigment | 2.50 | 2.50 | 2.50 | 2.50 | 2.50 |
| Dextran 500,000 Mw | 0.01 | 0.1 | 1 | 2 | 5 |
| Water | Balance | Balance | Balance | Balance | Balance |

Example 7

Decap Performance

The inkjet inks of Example 6 (Inks 8-12) were tested against Comparative Cyan Ink 2 from Example 2, and each was measured for decap. The decap was measured as the number of spits to print a normal drop after leaving the printing nozzle uncovered for 7 seconds. The results are listed in Table 9.

TABLE 9

| Ink | Decap (# spits) |
|---|---|
| Cyan Ink 8 | 1 |
| Cyan Ink 9 | 1 |
| Cyan Ink 10 | 2 |
| Cyan Ink 11 | 10 |
| Cyan Ink 12 | 50+ |
| Comparative Cyan Ink 2 | 1 |

Example 8

Functionalized Polysaccharide Comparative Ink

A comparative ink containing a functionalized polysaccharide, hydroxyethylcellulose, was prepared according to the amounts and compositional elements listed in Table 10.

TABLE 10

| Compositional Elements | Comparative Cyan Ink 3 (wt %) |
|---|---|
| 2$^{nd}$ Cyclic amide co-solvent | 5.88 |
| Nonionic surfactant | 0.30 |
| Proxel ® GXL (microbicide) | 0.10 |
| Kordek ™ MLX (microbicide) | 0.14 |
| CyanPigment | 2.50 |
| hydroxyethylcellulose | 0.10 |
| Water | Balance |

Example 9

Drop Weight and Drop Velocity

Comparative Cyan Ink 3 of Example 8 was tested for drop weight and drop velocity under the same printing conditions at various intervals, and the results are provided in Table 11 below.

TABLE 11

| MDPN | Drop Weight (ng) | Drop Velocity (m/s)* |
|---|---|---|
| 0 | 5.49 | — |
| 1 | 5.51 | — |
| 10 | 5.50 | — |
| 50 | 5.53 | — |
| 100 | 5.67 | — |
| 200 | 4.94 | — |
| % diff | −10 | — |

Notably, the hydroxyethylcellulose containing inkjet ink does not provide the drop weight and kogation performance of the non-functionalized polysachharide-containing inkjet inks. The drop velocity could not be tested due to serious nozzle problems during measurement that were caused by decap performance issues. The hydroxyethylcellulose containing inkjet ink had inferior decap as compared to that achieved with the Dextrans inks, i.e., a decap of 30; measured as the # of spits to print a normal drop after leaving the printing nozzle uncovered for 7 seconds.

Example 10

Dextran Effect

Two cyan inkjet inks, one in accordance with examples of the present disclosure and another comparative ink without a dextran, were each prepared by admixing the exact same compositional elements in the amounts listed in Table 12 with the only differing component being the dextran.

TABLE 12

| Compositional Components | Cyan Ink 13 (wt %) | Comparative Cyan Ink 4 (wt %) |
|---|---|---|
| $2^{nd}$ Cyclic amide co-solvent | 5.88 | 5.88 |
| Nonionic surfactant | 0.35 | 0.35 |
| Proxel ® GXL (microbicide) | 0.10 | 0.10 |
| Kordek ™ MLX (microbicide) | 0.14 | 0.14 |
| Pigment | 2.50 | 2.50 |
| Dextran 500,000 Mw | 0.01 | — |
| Water | Balance | Balance |

Both inks were tested for drop weight and drop velocity under the same printing conditions at various intervals as listed in Table 13.

TABLE 13

| | Drop Weight (ng) Inkjet Inks | | Drop Velocity (m/s) Comparative Inks | |
|---|---|---|---|---|
| MDPN | Cyan Ink 13 | Comparative Cyan Ink 4 | Cyan Ink 13 | Comparative Cyan Ink 4 |
| 0 | 5.70 | 4.96 | 10.42 | 8.66 |
| 1 | 5.55 | 4.93 | 10.10 | 8.63 |
| 50 | 5.97 | 5.17 | 10.76 | 9.87 |
| 350 | 5.19 | 2.86 | 8.39 | 3.88 |
| 700 | 5.32 | 2.70 | 8.68 | 3.88 |
| 1000 | 5.12 | 3.11 | 9.45 | 6.44 |
| % diff | −10 | −37 | −9 | −26 |

% diff is between initial (0) and 1000 MDPN; MDPN is million drops per nozzle (1000 MDPN is equivalent to 1 BDPN)

As shown in Table 13, the ink with dextran showed noticeable improvement in drop weight and drop velocity compared to the ink without dextran present.

While the disclosure has been described with reference to certain examples, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An inkjet ink, comprising:
   a colorant; and
   an ink vehicle including:
     an organic co-solvent,
     water, and
     from 0.0001 wt % to 0.1 wt % water soluble dextran based on the inkjet ink as a whole.

2. The inkjet ink of claim 1, wherein the dextran has a weight average molecular weight from 70,000 Mw to 500,000 Mw.

3. The inkjet ink of claim 1, wherein the dextran has a weight average molecular weight of at least 500,000 Mw.

4. The inkjet ink of claim 1, wherein the dextran is present in the inkjet ink in an amount ranging from about 0.01 wt % to about 0.05 wt %.

5. The inkjet ink of claim 1, wherein the inkjet ink is devoid of additional anti-kogation agents selected from the group of polymeric binder, fixing compound, and polyurethane.

6. The inkjet ink of claim 1, further comprising a second organic co-solvent and a surfactant and wherein the colorant is a pigment.

7. The inkjet ink of claim 1, wherein the inkjet ink maintains a drop weight within 20 wt % after 1 billion drops per nozzle of an initial drop per nozzle.

8. The inkjet ink of claim 1, wherein the inkjet ink maintains a drop velocity within 20 wt % after 1 billion drops per nozzle of an initial drop per nozzle.

9. A method of using a dextran as an anti-kogation additive in an inkjet ink, comprising combining a water soluble dextran with an ink vehicle of the inkjet ink, the inkjet ink including a colorant, and the ink vehicle comprising an organic co-solvent, water, and from 0.0001 wt % to 0.1 wt % dextran based on the inkjet ink as a whole.

10. The method of claim 9, further comprising adding a second organic co-solvent and a surfactant to the ink vehicle, and wherein the colorant is a pigment.

11. The method of claim 10, wherein the dextran has a weight average molecular weight from 70,000 Mw to 500,000 Mw.

12. The method of claim 9, wherein the dextran is present in the inkjet ink at from about 0.01 wt % to about 0.05 wt %.

13. A system for inkjet printing, comprising:
   an inkjet ink, comprising:
     a colorant; and
     an ink vehicle, the ink vehicle comprising:
       an organic co-solvent,
       water, and
       from 0.0001 wt % to 0.1 wt % of a water soluble dextran based on the inkjet ink as a whole; and
   an inkjet printer adapted to print the inkjet ink.

14. The system of claim 13, wherein after printing 1 billion drops per nozzle, the inkjet ink maintains a drop weight within 20 wt % of an initial drop per nozzle, and wherein inkjet ink maintains a drop velocity within 20% of the initial drop per nozzle.

15. The system of claim 13, wherein the inkjet ink is inkjettable from the inkjet printer at a 10 wt % increased drop weight and a 10% increased drop velocity compared to a comparative inkjet ink that is inkjetted using identical printer settings, wherein the comparative inkjet is identical to the inkjet ink except that it replaces the dextran with an equivalent amount of water.

\* \* \* \* \*